United States Patent [19]

Garrett

[11] 4,074,519
[45] Feb. 21, 1978

[54] SWIVEL SHACKLE
[75] Inventor: Charles Ronald Garrett, Tulsa, Okla.
[73] Assignee: American Hoist & Derrick Company, Tulsa, Okla.
[21] Appl. No.: 783,153
[22] Filed: Mar. 31, 1977
[51] Int. Cl.² ............................................. F16G 15/08
[52] U.S. Cl. ...................................... 59/95; 248/499; 294/82 R; 294/89; 403/78; 403/164
[58] Field of Search .................... 59/95, 86, 85, 93; 248/499; 24/201 LP, 68 CD; 294/82 R, 89; 403/78, 157, 164, 165, 62, 53

[56] References Cited
U.S. PATENT DOCUMENTS

| | | | |
|---|---|---|---|
| 679,889 | 8/1901 | Dorn | 59/86 |
| 2,010,853 | 8/1935 | Dyer | 59/86 |
| 3,297,293 | 1/1967 | Andrews | 403/164 |
| 3,453,822 | 7/1969 | Crook | 59/85 |
| 3,492,033 | 1/1970 | Mueller | 59/95 |
| 3,905,633 | 9/1975 | Larson | 294/82 R |

Primary Examiner—C.W. Lanham
Assistant Examiner—Gene P. Crosby
Attorney, Agent, or Firm—Head, Johnson & Chafin

[57] ABSTRACT

A fastening device for connecting a tension member to an object, whereby a force can be applied to the object in any direction within a hemisphere centered about the point of attachment to the surface of the object. The swivel shackle comprises a shoulder bolt which is adapted to be attached to the object and has a cylindrical portion of larger diameter than the base portion which is attached to the object, as by threads. A unitary load ring comprises a body portion having a circular bored opening adapted to rotate on the cylindrical portion on the bolt. The load ring has two oppositely directed shafts extending from the body portion. A Y-shaped pivot assembly is provided which has an opening in each of the arms of the Y, which are adapted to fit over and rotate about the shaft extension on the load ring. The leg of the Y has an opening, to which a shackle can be attached, by passing the pin of the shackle through the opening in the leg of the Y.

8 Claims, 3 Drawing Figures

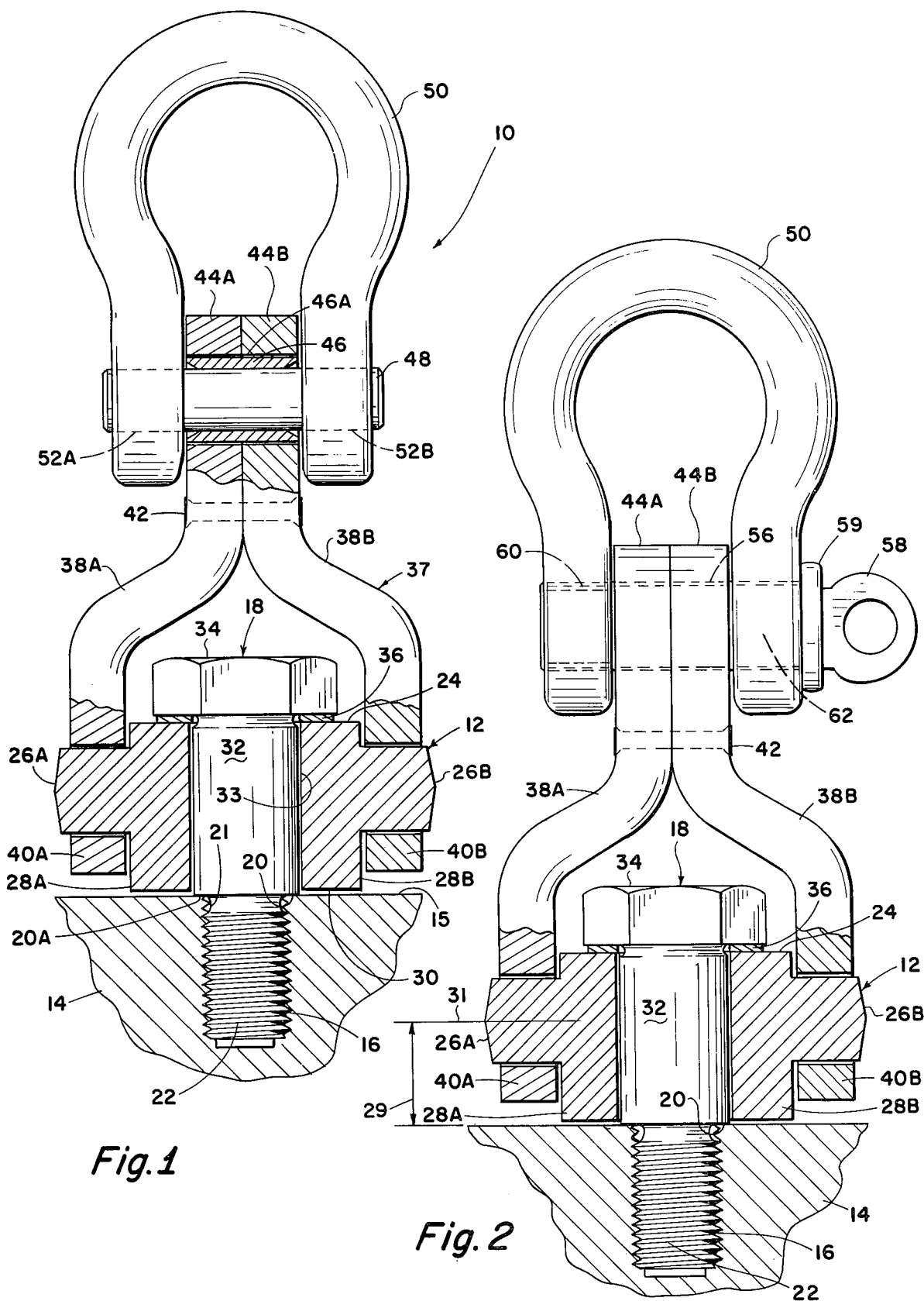

SWIVEL SHACKLE

BACKGROUND OF THE INVENTION

1. Field of the Invention

This invention lies in the field of attachment devices.

Still more particularly this invention concerns a type of attachment device which can be attached to an object either by means of a threaded opening or by means of a bolt, that can be passed through an opening in the object and locked by means of a nut.

Still more particularly this invention concerns a type of attachment device by means of which a tensile force can be applied to the bolt, and to the object, wherein the bolt has adequate strength for any direction of the force within a hemisphere, centered about the point of attachment of the device to the object.

2. Description of the Prior Art

In the prior art, fittings used for applying cables or other tensile members to the surface of a large object, or to a heavy base, have usually employed eye bolts, or ring bolts. Such eye bolts, because of their rigid construction, do not have the same load carrying capabilities for all directions of the applied force, relative to the axis of the bolt. Therefore, this requires that the user predetermines the optimum direction of the force loading the eye bolt, and maintains that direction of loading when handling the object to be lifted, or the device to be attached to the base.

Other devices have been described in the literature which do provide a universal type connection between the cable and the object. However, in most of these the attachment between the cable and the bolt is at some considerable distance from the plane of the surface of the object, and therefore the transverse bending moments can be dangerously large.

SUMMARY OF THE INVENTION

It is a primary object of this invention to provide an attachment device, or swivel shackle, which can be attached to a surface of a large object, or base, so that a tensile member such as a cable, can be connected to the bolt, so as to apply forces to the object in any selected direction.

It is a further object of this invention to provide a universal type connection between the tensile member and the attachment device, so that a minimum bending moment is provided when the direction of the tensile force is approximately parallel to the surface of the object.

These and other objects are realized and the limitations of the prior art are overcome in this invention, by providing a very simple construction, having a shoulder bolt which for example, may have a threaded shank which can be threaded into a tapped opening in a surface of the object. The diameter of the cylindrical portion of the bolt is sufficiently great so that a shoulder is provided at the junction with the shank, which will withstand a selected bending moment of the bolt about the axis of the threaded shank.

A load ring, of unitary construction, is provided having a body portion, including a circular bored opening, through which the bolt is inserted so that the ring can rotate about the cylindrical portion of the bolt, after the bolt is locked with the shoulder tight against the surface of the body. The load ring has two outwardly extending co-axial short shafts, on opposite sides of the body.

A Y-shaped pivot assembly has a pair of openings in the arms of the Y which are adapted to fit over, and swivel about, the shaft extensions of the body. The leg of the Y has an opening through which the pin of a shackle can be passed, so as to lock the shackle to the pivot assembly which rotates about the body in a plane perpendicular to the shaft extensions of the body. The body can further rotate about the cylindrical portion of the shoulder bolt.

The shoulder bolt can be locked into a tapped hole in one surface of the body, or it can be in the form of a long bolt threaded at the end, which is adapted to pass through a drilled opening in the body, and to be locked by means of a nut on the opposite surface of the body.

Various types of shackles with different types of shackle pins can be connected to the leg of the Y-shaped pivot assembly.

BRIEF DESCRIPTION OF THE DRAWINGS

These and other objects and advantages of this invention and a better understanding of the principles and details of the invention will be evident from the following description taken in conjunction with the appended drawings in which;

FIG. 1 illustrates one embodiment of this invention, in which a stud bolt is used, and including a shackle in which the pin is locked in the shackle by means of a locking sleeve inside the opening in the leg of the pivot assembly.

FIG. 2 illustrates an embodiment in which a different type of shackle is used to connect to the pivot assembly.

FIG. 3 also illustrates the use of a shackle which includes a wire rope socket, for attachment to a cable.

DESCRIPTION OF THE PREFERRED EMBODIMENT

Figure 3:
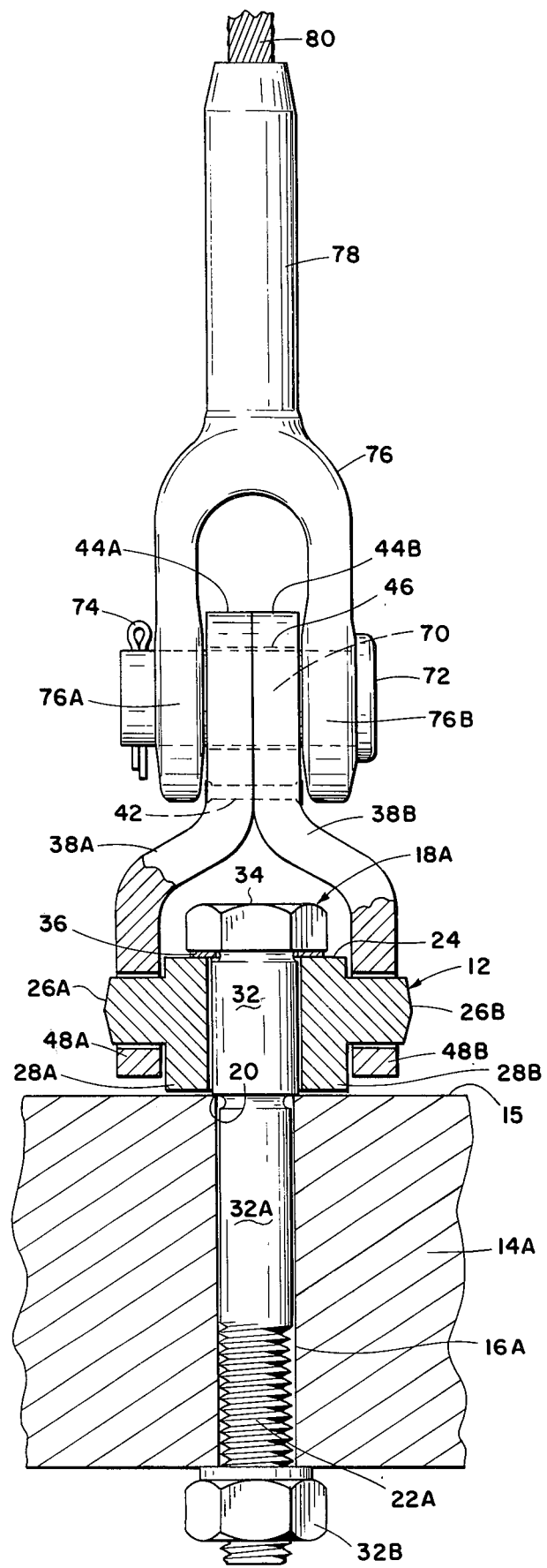
FIG. 3 illustrates an embodiment of the invention in which the shoulder bolt comprises a long bolt having a threaded shank, which can be locked through an opening in the body, by means of a nut.

Referring now to the drawings, there is shown in FIGS. 1 and 2 an embodiment of this invention which utilizes a stud type shoulder bolt. The entire assembly of bolt, load ring, pivot arms and shackle are indicated generally by the numeral 10. The numeral 12 indicates generally the bolt and load ring assembly. The numeral 18 illustrates generally the shoulder bolt.

There is a tapped opening 16 in one surface of a large and heavy body, or base 14, to which a tensile force is to be connected. The direction of the tensile force can be any direction within a hemisphere centered about the surface 15 of the body 14 and the axis of the bolt 18.

The bolt 18 includes a cylindrical portion 32 of selected diameter and selected length. A head 34 which can be of a hexagonal or any other shape with which an appropriate wrench can be used. There is a threaded extension 22, of lesser diameter than the cylindrical portion 32, such as to provide a shoulder 20 such that when the bolt is screwed tight into the socket 16, there will be a load bearing edge 20A, such as to resist transverse bending of the bolt, when the tensile force is transverse to the axis of the bolt. There is a shallow circumferential channel 21 cut in the threaded portion of the bolt adjacent the shoulder, for the purpose, as is well known, of minimizing stress at that point. A similar stress relieving portion is provided at the junction of the bolt head 34 and the body portion 32.

A load assembly of unitary construction is provided, with a body portion 24, through which a bored opening 33 is provided of slightly larger diameter than the cylindrical portion 32 of the bolt. The bolt can be slipped through this opening and screwed into the body 14 and locked tight by means of the head 34. There is a thin thrust washer 36 between the bolt head 34 and the load assembly 12 such that the load assembly can rotate freely when confined between the surface 15 of the object, the thrust washer 36, and the bolt head 34. The load assembly has two oppositely extending short circular shafts, 26A and 26B, which are coaxial, and their axis is perpendicular to the axis of the opening 33.

A pivot arm assembly 37 comprises two pivot arms 38A and 38B, which are shaped so that when two ends 44A and 44B are clamped together, as by a rivet 42, it will form a Y-shaped pivot assembly, with the arms of the Y, 40A and 40B, spaced apart by a dimension which is slightly larger than the two parallel faces 28A and 28B of the body. Openings are provided in the two arms of the Y such that they can be slipped over the shaft extensions 26A and 26B, and the two pivot arms locked together by the rivet 42, to form a rigid assembly.

The Y-shaped pivot assembly has an opening 46A in the leg of the Y, which is of sufficient diameter such that a locking sleeve 46 can be inserted. A shackle 50 is provided with two ears which are spaced apart to slip over the width of the leg 44A, 44B. A pin 48 is then slipped through the opening 52A in the ear of the shackle, which can be hammered into, and locked by, the locking sleeve 46, and through the second ear 52B. Thus the pin will not move out of the ears unless forced out by suitable means.

The axis 31 of the projecting shafts 26A and 26B is positioned as close 29 to the shoulder of the bolt as possible, leaving only sufficient space for the projections 40A and 40B of the pivot assembly to clear the surface 15 of the body. By this means, a transverse force on the bolt has a minimum moment arm, and therefore there is a minimum of bending stress in the bolt.

A cable loop or other attachment means can be applied to the shackle 50 to exert a force, 50 which is applied through the pin 48 to the pivot assembly 38, and through the shafts 26A, 26B to the load ring 24, and to the bolt 18. Since the load ring can rotate about the axis of the bolt, and the axes of the shafts 26A, 26B are perpendicular to the axis of the bolt, the force that is applied to the shackle 50 can be exerted in any direction within 360° of the axis of the bolt, and within any angle up to 90° between its direction and the surface 15 of the object 14.

The shape of the body of the load ring 12 can be anything desired, provided that there are two parallel opposite faces 28A and 28B, which have the outwardly directed shafts, which support the pivot assembly. Thus the body portion can be square with two opposite faces 28A and 28B, or it can be hexagonal, or any selected shape, which includes the two faces 28A and 28B.

Referring now to FIG. 2, there is shown a similar bolt and shackle assembly, as in FIG. 1, except that the shackle 50 has a pin which comprises a body portion 62, and a shoulder 59 and a ring 58. The opposite end of the pin 60 is threaded and is adapted to screw into a threaded opening in one ear of the shackle. The opening 56 in the leg of the Y-shaped swivel assembly is appropriate for the type of pin that is inserted into the shackle. This opening is different of course from FIG. 1.

Referring now to FIG. 3, the object 14A is of a different shape than object 14 of FIGS. 1 and 2, having a portion of limited thickness through which there is an opening 16A which is drilled, and into which can be inserted a long shank 32A of the bolt 18A. The shank is long enough to extend through the opening 16A, and a nut 32B is provided for screwing onto the threaded portion 22A, so that the bolt 18A can be locked into the opening 16A through the body 14A, with the shoulder 20 pressed tightly against the surface 15.

The load ring 12 is similar to that of FIGS. 1 and 2, as in the cylindrical portion 32 of the bolt and the head 34. The Y-shaped pivot assembly 38A, 38B is also similar.

In FIG. 3 a type of shackle 76 is provided which has two ears which are pierced with openings 76A, 76B through which a pin 70 can be provided. The pin has a head 72 on one end, and a locking means, such as a cotter pin 74, on the other end. The type of shackle illustrated includes a wire rope socket 78, by means of which a wire cable 80 can be anchored into the shank 78 of the shackle 76.

What has been described is a shackle type of swivel assembly, for applying a tensile force to a bolt, attached to a surface of a large and heavy object. The direction of application of the force can be any desired angle within a hemisphere centered about the bolt. The design is such that when the force is parallel to the surface of the object, that is, perpendicular to the axis of the bolt, a minimum moment of force is applied. The design of the bolt includes a shoulder such that the pressure of the shoulder edge against the object is such as to minimize the deflection, stress and strain of the bolt. The device can be designed for any type of shackle means for connection of a tensile member to the bolt assembly.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A swivel shackle means for applying a tensile load to an object, comprising;
    a. a shoulder bolt adapted to be attached to said object, said bolt having a cylindrical portion of larger diameter than the attachment portion, said larger diameter portion providing a shoulder which presses against the surface of said object, to resist transverse bending moments on said bolt;
    b. a load ring of unitary construction, having a body portion, including a circular bored opening, and adapted to rotate about said cylindrical portion of said shoulder bolt, and including two oppositely extending shaft portions, coaxial with each other, and perpendicular to the axis of said bore;
    c. a Y-shaped pivot assembly, having bored openings on the ends of the two arms of said Y, said openings adapted to rotate about said shaft extensions of said load ring; and
    d. an opening through the leg of said Y-shaped pivot assembly, adapted to receive the pin of a shackle.

2. The swivel shackle means as in claim 1 in which said attachment portion comprises a threaded stud which is adapted to be screwed into a tapped hole in said object.

3. The swivel shackle means as in claim 1 in which said attachment portion comprises a threaded bolt which is adapted to be inserted through an opening in said object, and locked by a nut.

4. The swivel shackle as in claim 1 including a thrust washer between the head of said shoulder bolt and said load ring.

5. The swivel shackle as in claim 1 in which said Y-shaped pivot assembly comprises two pivot arms, which are each adapted to be placed over one of said shaft extensions on said load ring, and including means to clamp the two free ends of said arms together, to form the leg of said Y.

6. The swivel shackle as in claim 1 including a shackle, having a pin; said leg of said Y-shaped pivot assembly including a locking sleeve inside said opening, adapted to hold said pin in place.

7. The swivel shackle as in claim 1 including a shackle which is locked to said pivot assembly by a threaded pin.

8. The swivel shackle as in claim 1 including a shackle which is attached to a cable by means of a cable socket.

* * * * *